A. MARCELLUS.
Potato-Digger.
No. 52,428. Patented Feb. 6, 1866.
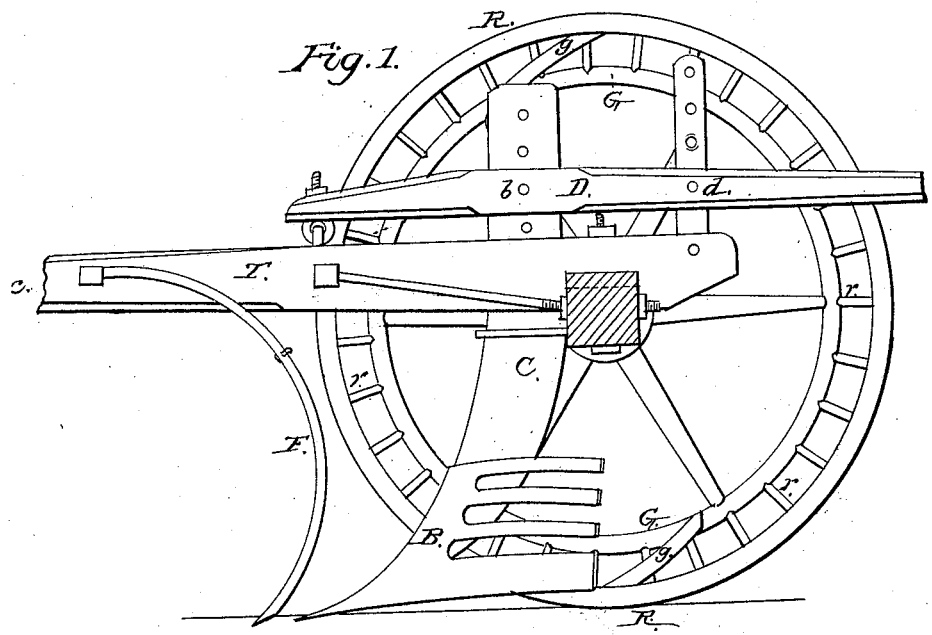
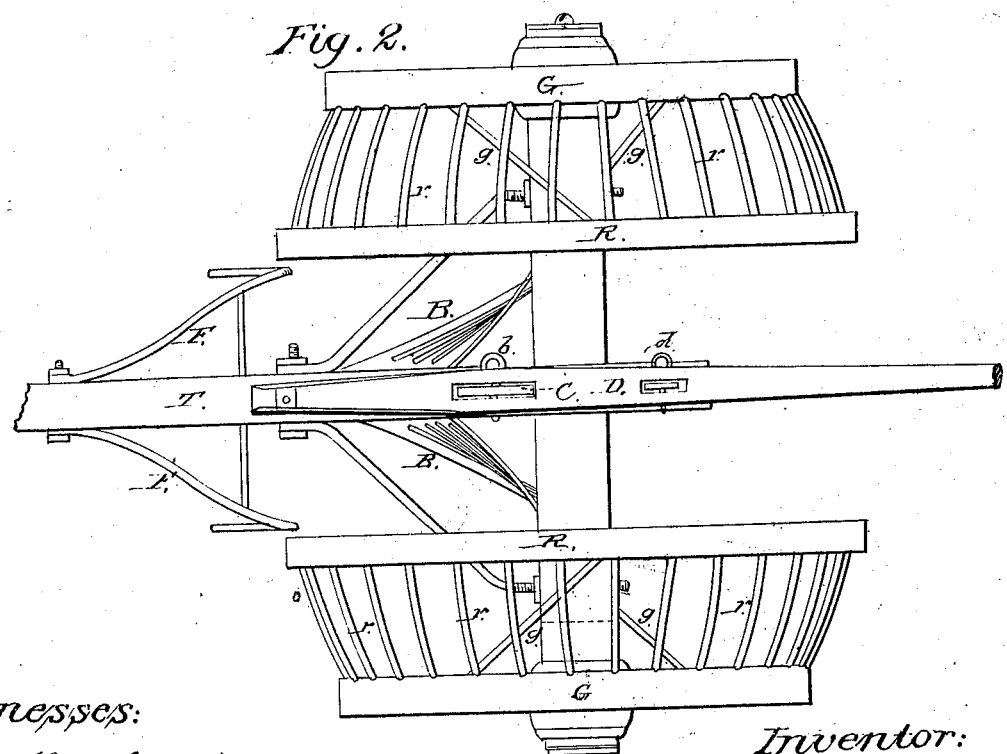
Witnesses:
Wm. S. Loughborough
Asa H. Billings
Inventor:
Albert Marcellus

UNITED STATES PATENT OFFICE.

ALBERT MARCELLUS, OF PITTSFORD, NEW YORK.

IMPROVEMENT IN POTATO-DIGGERS.

Specification forming part of Letters Patent No. 52,428, dated February 6, 1866.

*To all whom it may concern:*

Be it known that I, ALBERT MARCELLUS, of Pittsford, in the county of Monroe and State of New York, have invented certain new and useful Improvements in Potato-Diggers; and I do hereby declare that the following is a full, clear, and exact description thereof, reference being had to the accompanying drawings, making part of this specification, in which—

Figure 1 is a side elevation of my invention with the left-hand wheel removed. Fig. 2 is a top view of the machine complete.

Similar letters of reference indicate corresponding parts in both figures.

This invention consists, mainly, in the application to potato-diggers of two ground-wheels of peculiar construction, they being so arranged as to receive the furrows of earth and potatoes from the double mold-board plow, the wheels acting as separators, and discharging the potatoes centrally in the rear.

To enable others to make and use my invention, I will describe its construction and operation.

I add to the ordinary ground-wheels G an auxiliary or secondary rim, R, of a larger diameter than the wheels proper. They are connected with the rim of the wheels G by a series of rods, $r$, as shown in the drawings, which constitute them revolving conical separators. The rods $r$ should be near enough together to prevent the smallest potatoes which are desired to be saved from passing through the interstices. The rims R of course constitute the tread of the wheels.

The mold-boards B of the plow are made in skeleton form, as clearly shown in Fig. 1, and the shank C passes through the tongue, and is secured to the adjusting-lever D, the front end of which is hinged to the tongue T by eyebolts. The gage of the plow is regulated by the pins $b$ and $d$, and when the machine is to be moved to or from the field, or from one field to another, the pin $d$ is placed in one of the upper holes, which swings the plow entirely clear from the ground.

The object of the diagonal bar $g$ is to insure the delivery of the potatoes from the wheels. There may be one or more bars $g$, as circumstances may seem to require; yet it is believed that when the proper curvature is given to the rods $r$, and the proper relative diameter of the rim R and wheel G, and their distance apart is properly regulated, that the bars will be unnecessary; or, as an equivalent, the rods $r$ may be put in spiraling instead of radial.

The vines have heretofore been a great annoyance in the use of potato-diggers. This seems to be wholly removed by the use of the vine-adjuster F, which is hinged to the tongue, and the points or teeth catch and straighten the vines in the direction of the travel of the machine, which prevents their clogging the plow or the wheels. The wheels travel between the rows, so that the plow shall divide the hills and throw them each way into the wheels, whence they are discharged after being separated from the earth.

There may be several holes, $c$, in the tongue, so as to set the vine-adjuster forward or back, as desired.

What I claim as my invention, and desire to secure by Letters Patent, is—

1. The ground-wheels G of potato-diggers, when constructed substantially as and for the purposes set forth.

2. The combination of the ground-wheels G with the double-mold-board plow B, they being so arranged relatively that the wheels shall receive the furrows from the plow, as and for the purposes set forth.

ALBERT MARCELLUS.

Witnesses:
   WM. S. LOUGHBOROUGH,
   ASA H. BILLINGS.